March 6, 1951      A. M. LEITZEL      2,544,461
SAW ATTACHMENT FOR DRILLS
Filed May 25, 1948      2 Sheets-Sheet 1
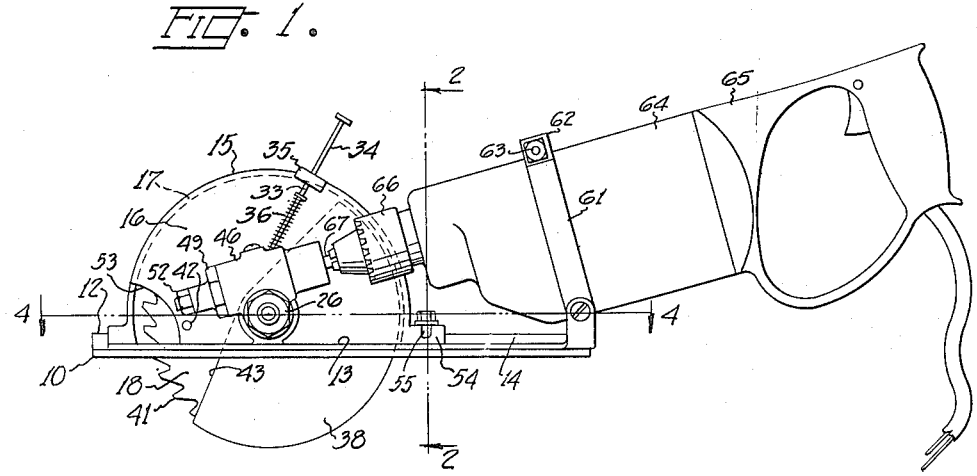
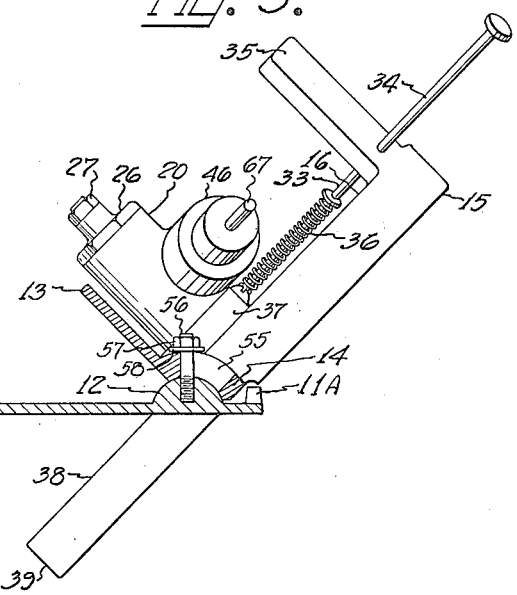
INVENTOR
AMMON M. LEITZEL
BY
ATTORNEY March 6, 1951 A. M. LEITZEL 2,544,461
SAW ATTACHMENT FOR DRILLS
Filed May 25, 1948 2 Sheets-Sheet 2
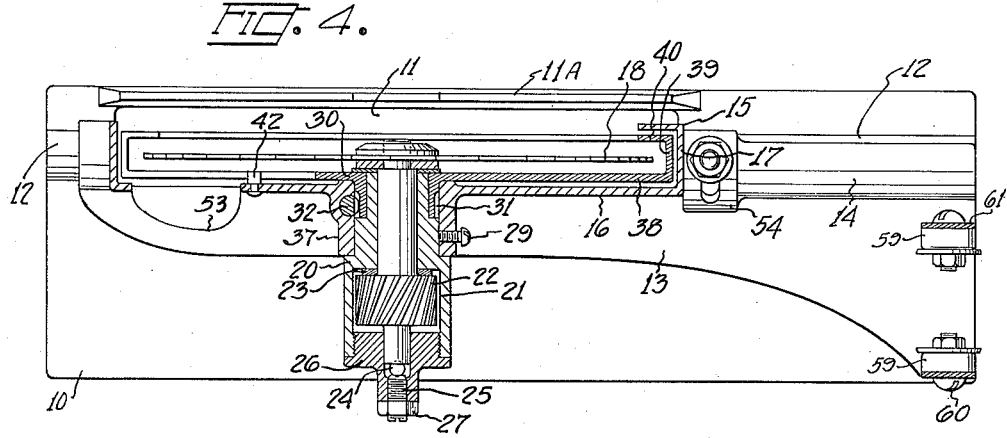
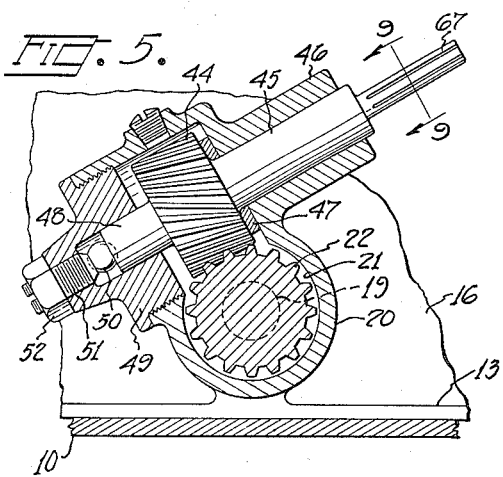
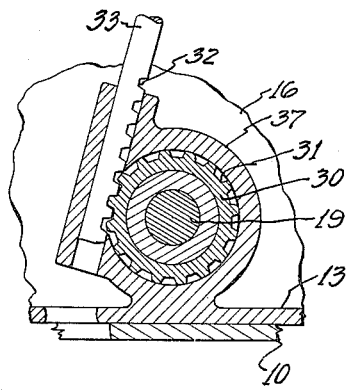
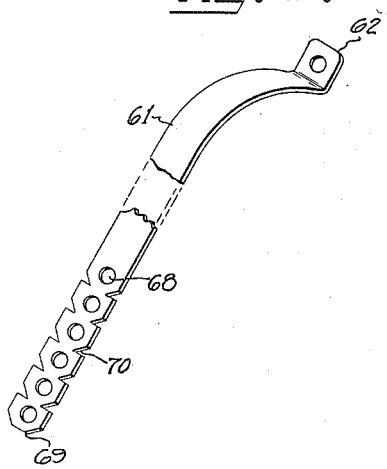
INVENTOR
AMMON M. LEITZEL
BY
ATTORNEY Patented Mar. 6, 1951

2,544,461

UNITED STATES PATENT OFFICE 2,544,461

SAW ATTACHMENT FOR DRILLS

Ammon M. Leitzel, Portland, Oreg., assignor to Future Products, Portland, Oreg., a corporation of Oregon Application May 25, 1948, Serial No. 29,043

1 Claim. (Cl. 143—43)

This invention relates generally to sawing devices and particularly to a saw attachment for electrically driven drills.

The main object of this invention is to provide a means for driving a circular saw from the chuck of an electric drill and at the same time make it possible to accurately and safely guide the saw.

I accomplish this and other objects in the manner set forth in the following specification as illustrated in the accompanying drawing, in which:

Fig. 1 is a side elevation showing an electric drill and its relation to the attachment.

Fig. 2 is a section taken along the line 2—2 in Fig. 1.

Fig. 3 is a section similar to Fig. 2, but showing the saw tilted at 45° for cutting a miter.

Fig. 4 is a section taken along the line 4—4 in Fig. 1.

Fig. 5 is a section taken along the line 5—5 in Fig. 2.

Fig. 6 is a section taken along the line 6—6 in Fig. 2.

Fig. 7 is an end view of the band clamp for the drill motor.

Fig. 8 is a perspective view of a band clamp.

Fig. 9 is a section taken along the line 9—9 in Fig. 5.

Like numbers of reference refer to the same or similar parts throughout the several views.

Referring in detail to the drawing, there is shown a base plate 10 having a rectangular opening 11 formed therein. A stiffening rib 11—A is formed along one edge of the opening 11.

A half round rib 12 extends across the plate 10 intersecting the opening 11. On the base 10 is mounted a frame 13 having a rounded rib 14 which rides on the rib 12.

Between the ends of the rib 12 is formed a fixed saw guard 15 whose side 16 is closed and whose side 17 is a flange which covers 180° of a saw 18 which is mounted on a shaft 19 which journals in the sleeve 20, having a recess 21 which receives a spiral gear 22, on one side of which is a friction washer 23 while on the other end of the shaft is a ball 24 serving as a thrust bearing which is adjusted by a set screw 25 which is mounted in the threaded plug 26 which in turn is threaded into the recess 21.

A lock nut 27 is placed on the screw 25. The sleeve 20 in the hub 28 is held against rotation by the screw 29. Rotatable on the sleeve 20 is the hub 30 into which is cut a gear 31 which meshes with a rack 32 formed in the plunger 33 whose button end 34 guides in the handle 35 and the plunger 33 is urged outwardly by a spring 36 which is secured to the plunger 33 and reacts against the boss 37.

On the hub 30 is formed the movable saw guard 38 whose closed peripheral side 39 is integral with the hub 30 while its flanged rim 40 extends inwardly to guard the teeth 41 of the saw 18.

A stop pin 42 is mounted in the guard 15 and limits the movements of the guard 38 by contact with the edge 43.

The gear 22 meshes with the spiral gear 44 formed on the shaft 45 which journals in the housing 46 which is integral with the sleeve 20 which forms a housing for the gear 22. The gear 44 is separated from the hub 46 by means of the friction washer 47.

The stub end 48 of the shaft 45 journals in the threaded plug 49, which is mounted in the housing 46, is provided with a ball thrust bearing 50 which is held by the cupped adjusting screw 51 whose position is fixed by the lock nut 52.

It is desirable to provide an opening 53 in the frame 13 for the escape of sawdust and for the observation of the teeth.

In order to fix the frame 13 with relation to the base 10, I have provided the rib 14 with an enlarged boss 54, through which is formed a slot 55 in which is disposed a stub bolt 56 which is threaded into the rib 12.

On the bolt 56 is placed a clamping nut 57, under which is placed a washer 58.

On the frame 13 are formed the spaced lugs 59 to which are secured by the bolts 60 the clamping bands 61 whose ends 62 are connected by the bolt 63, by means of which the bands 61 may be securely clamped upon the drill motor 64 of an electric drill 65 whose chuck 66 is clamped upon the splined shaft end 67.

To install an electric drill, it is first necessary to loosen the set screw 29 and insert the drill motor 64 through the binding straps and then tighten the drill chuck 66 securely to the shaft 67.

Then adjust the clamping bands 61 to fit the motor 64 by placing the bolts 60 in the proper holes 68 and breaking of the excess end 69 at the desired notch 70.

Then the motor 64 is properly aligned with relation to the plane of the saw 18, then the bolt 63 is tightened, then the screw 29 is tightened which holds the parts in position.

It is a good plan when once the position of the screw 29 is determined, to countersink its contacting member to insure against movement. Any other means for holding the parts against movement may be employed without departing from the spirit of this invention.

I claim:

An attachment for electric drills consisting of a base plate having a longitudinal saw slot formed along one edge, and having a rounded rib at each end of the plate in line with the slot, a saw frame having concave portions resting on said rib, a screw for clamping said frame on said base in desired angular relation thereto, a sleeve rockably mounted in said frame, a set screw for fixing the relation of said sleeve and frame, a saw arbor journalling in said sleeve, a circular saw on said arbor extending through said base slot, spiral gears mounted in said sleeve, one of which is on said arbor and the other having a shaft which projects from said sleeve normal to said arbor, a saddle formed on one end of said frame in which an electric drill can rest while said projecting shaft is held in the chuck of said drill and a band clamp for holding said drill in said saddle.

AMMON M. LEITZEL.

REFERENCES CITED

The following references are of record in the file of this patent:

UNITED STATES PATENTS

| Number | Name | Date |
|---|---|---|
| 1,102,018 | Dodds | June 30, 1914 |
| 1,618,341 | Howland | Feb. 22, 1927 |
| 1,708,345 | Wodack et al. | Apr. 9, 1929 |
| 1,808,228 | Hulack et al. | June 2, 1931 |
| 1,850,137 | Pursell | Mar. 22, 1932 |
| 1,858,459 | Ramey | May 17, 1932 |
| 1,900,553 | Hampton | Mar. 7, 1933 |
| 2,319,973 | Broderhausen | May 25, 1943 |
| 2,342,052 | Jimerson et al. | Feb. 15, 1944 |
| 2,346,961 | Gundelfinger et al. | Apr. 18, 1944 |

FOREIGN PATENTS

| Number | Country | Date |
|---|---|---|
| 88,895 | Sweden | Mar. 31, 1937 |